(12) United States Patent
Gwen

(10) Patent No.: US 12,024,455 B2
(45) Date of Patent: *Jul. 2, 2024

(54) APPARATUS FOR MINERALIZING DRINKING WATER

(71) Applicant: CORE PACIFIC INC., Houston, TX (US)

(72) Inventor: Patrick Gwen, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,998

(22) Filed: Feb. 28, 2023

(65) Prior Publication Data

US 2024/0034659 A1  Feb. 1, 2024

Related U.S. Application Data

(63) Continuation of application No. 17/815,479, filed on Jul. 27, 2022, now Pat. No. 11,597,669.

(51) Int. Cl.
| | |
|---|---|
| *C02F 9/00* | (2023.01) |
| *C02F 1/00* | (2023.01) |
| *C02F 1/44* | (2023.01) |
| *C02F 1/68* | (2023.01) |

(52) U.S. Cl.
CPC .............. *C02F 9/00* (2013.01); *C02F 1/003* (2013.01); *C02F 1/441* (2013.01); *C02F 1/68* (2013.01); *C02F 2201/005* (2013.01); *C02F 2301/066* (2013.01); *C02F 2307/06* (2013.01)

(58) Field of Classification Search
CPC .. C02F 9/00; C02F 1/003; C02F 1/441; C02F 1/68; C02F 2201/005; C02F 2301/066; C02F 2307/06; C02F 1/283
See application file for complete search history.

(56) References Cited

U.S. PATENT DOCUMENTS

2004/0173556 A1* 9/2004 Smolko .............. B65D 81/3886
215/11.5

FOREIGN PATENT DOCUMENTS

| GB | 2218688 A | * 11/1989 | ........... B67D 1/0079 |
|---|---|---|---|
| WO | WO-2021101990 A1 | * 5/2021 | ........... B67D 1/0031 |

* cited by examiner

*Primary Examiner* — Terry K Cecil

(74) *Attorney, Agent, or Firm* — Egbert, McDaniel & Swartz, PLLC

(57) ABSTRACT

An apparatus for the mineralization of drinking water has a housing with an inlet and an outlet, a filter positioned in the housing, a container receptacle assembly affixed to or formed on the housing, a pump cooperative with the container receptacle assembly, and a manifold connected to an outlet of the pump and to an outlet of the filter. The filter is connected to the inlet of the housing and adapted to filter contaminants. The container receptacle assemblies adapted to connect with a bottle containing a mineral or supplement therein. The pump is adapted to pass the mineral or supplement in a measured amount from the bottle. The manifold is adapted to mix the mineral or supplement with the filtered water so as to discharge a mineralized drinking water through the outlet.

14 Claims, 6 Drawing Sheets

APPARATUS FOR MINERALIZING DRINKING WATER

CROSS-REFERENCE TO RELATED APPLICATIONS

The present application is a continuation of U.S. application Ser. No. 17/815,479, filed on Jul. 27, 2022, presently pending.

BACKGROUND OF THE INVENTION

1. Field of the Invention

The present invention relates to water filter assemblies. More particularly, the present invention relates to water filter assemblies wherein minerals are added to filtered water. More particularly, the present invention relates to the controlled mineralization of the drinking water.

2. Description of Related Art Including Information Disclosed Under 37 CFR 1.97 and 37 CFR 1.98

In the art of water treatment, it is well-known to purify water for human consumption by implementing specific purifying processes. These purifying processes included, for example, the processes of filtration, sediment, bacterial digestion, distillation or reverse osmosis. In reverse osmosis, for example, a volume of liquid containing contaminants is introduced into a chamber on one side of a semi-permeable membrane (i.e. having pores large enough to pass the molecules of the liquid but not those of the solute contaminant). By pressurizing the liquid above its osmotic pressure, the liquid molecules will diffuse across the membrane but the solute molecules will remain. The resulting brine is then discarded and the liquid is thus purified and retained.

Such reverse osmosis systems can be configured to produce purified water from virtually any source and remove many of the contaminants contained therein, including dissolved mineral ions, with great effectiveness. While this is advantageous for many reasons and in many applications, it is nonetheless imperfect for the production of drinking water. Specifically, in the case of a reverse-osmosis process, it is not selective. In other words, it removes all dissolved mineral ions, both those which are desirable for health and taste along with those which are not. In the end, the produced water is a demineralized water free of any mineral ions.

It is therefore known to pass the demineralized water through a subsequent step for replenishing certain minerals lost and adding other desirable minerals not present in the water prior to the start of the purification process. In particular, calcium, magnesium and bicarbonate are particularly desirable. Their presence in drinking water may contribute to establishing and maintaining physical and mental health. These ions are also partly responsible for creating a pleasant taste in the drinking water.

One such means of doing this is to dissolve a mixture of mineral salts into the water. Commonly employed additives include calcium chloride, magnesium sulphate, chloride, bicarbonate of sodium, or potassium. However, the use of such salts will result in the presence of unwanted chloride, sulfate, sodium and potassium ions which can negatively affect the taste of water and bring a bitter and/or salty taste in the final product. At certain quantities, these can have deleterious effects on the health of certain sensitive customers (i.e. for people having specific diets, for example).

In the past, the minerals that are to be introduced into the filtered water are provided in a pellet form. Typically, the minerals are encapsulated in clay which slowly dissolves as the minerals are dissolved into the water. Unfortunately, the quality control of such mineral-bearing clay pellets is often inconsistent and quality control is minimal. As a result, the quality of the minerals, the quantity of the minerals, and the rate of mineral diffusion in the drinking water can be relatively uncontrolled. Under certain circumstances, the initial water washing across the mineral-bearing clay pellets will have a large amount of minerals therein. Later passages of water across the mineral-bearing clay pellets will have a lower mineral content. As such, the exact dosing of minerals into the drinking water is unavailable in the prior art.

It is the goal of the remineralization process to re-mineralize demineralized water with ions and minerals so as to establish and maintain physical and mental health while avoiding the undesirable ones for taste or health issues. It is therefore desirable to provide a means for re-mineralizing demineralized water with desirable ions, without also adding undesirable amounts, counter-ions and/or compounds.

In the past various patents and publications have issued with respect to the mineralization of drinking water. For example, U.S. Patent Application Publication No. 2018/0370826, published on Dec. 27, 2018 to Sublet et al., teaches a method and apparatus for providing re-mineralized water. In particular, this method includes the steps of providing a flow of feedwater and purifying and/or demineralized it by a purifying and/or demineralizing process to produce a flow of purified, demineralized water. Carbon dioxide is injected into the purified, demineralized water to provide a flow of carbon dioxide-enriched water. The carbon dioxide-enriched water is then passed through a re-mineralizer which comprises a dolomite medium. This produces a simultaneous re-mineralization of the water with calcium and magnesium and thus leads to a flow of purified, re-mineralized water.

U.S. Patent Application Publication No. 2020/0055753, published on Feb. 20, 2020 to Minor et al., teaches a water treatment system for treating and distributing water. The system includes a first container and an input conduit that supplies water (both purified and unpurified) to the first container. The system also has a treatment delivery system that delivers a mineral composition into the first container. The system uses a controller to selectively deliver the mineral composition into the first container so that the mineral composition mixes with and dissolves in the water delivered to the first container. This produces treated water having a desired to profile.

European Patent Application No. EP 3 831 468, published on Jun. 9, 2021 to M. Philiburt, discloses a process for providing mineralized drinking water. In particular, this is directed toward providing drinking water from polluted fresh or brackish water.

U.K. Patent Application Serial No. 2590533, published on Jun. 30, 2021 to A. Levy, provides a system and process of mineralizing distilled water with a replenishment of old mineral concentrates solutions. The system comprises a splitter for splitting distilled water into primary and secondary portions. First and second conduits convey the primary and secondary portions, respectively. A column having a mineral matrix is connected to the second conduit to generate a mineralizing concentrate solution. A mixing module is provided for combining a predefined amount of the mineralized concentrate solution with the primary portion of distilled water in order to form a mineralized water mixture. A dispensing module dispenses the mineralized water mixture. A carbonator is connected to the secondary conduit for dissolving carbon dioxide in the secondary portion of the distilled water.

International Publication No. WO 2007/010549, published on Jan. 25, 2007 to M. Gupta, discloses a household reverse osmosis-based drinking water purifier. This purifier has controlled natural mineral content in the purified water. There is a means for subjecting the raw water to reverse osmosis purification to provide treated demineralized water. There is a means for controlled natural mineral incorporation in the demineralized water by purifying the water through OF and/or UV treatment so as to provide for a reverse osmosis-treated and controlled natural mineral content purified water.

International Publication No. WO 2020/127612, published on Jun. 25, 2020 to Wagemanns et al., provides a method and apparatus for producing potable mineralized water. In particular, this method and apparatus uses a cartridge containing a mineral composition. The method includes providing a liquid to be treated to an apparatus for producing the potable mineralized water and adding a carbon dioxide precursor to the liquid. At least a portion of the carbon dioxide precursor is triggered to release carbon dioxide in order to provide carbon dioxide to the liquid. At least parts of the liquid are contacted with a mineral composition such that the mineral composition at least partially dissolves into the liquid in order to provide the potable mineralized water.

International Publication No. WO 2021/234709, published on Nov. 25, 2020 to Makmel et al., discloses a system and method for differential enrichment of water. In particular, this provides for specifically controlled admission of minerals and other nutrients into untreated water or water that has been preliminarily treated in order to selectively remove contaminants therefrom and to provide a desired nutrient profile in the water for use and consumption.

It is an object of the present invention to provide a water mineralization system that effectively re-mineralizes water.

It is another object of the present invention to provide a mineralization system that produces a healthy water output.

It is another object of the present invention to provide a mineralization system which avoids the use of chemicals.

It is another object of the present invention to provide a mineralization system that produces no residue.

It is another object of the present invention to provide a mineralization system that consistently introduces minerals into water.

It is another object of the present invention to provide a mineralization system that provides consistent dosing of the minerals into the water.

It is another object the present invention to provide a mineralization system that promotes better vitamin and mineral absorption than the use of pills, tablets and pellets.

It is another object of the present invention to provide a mineralization system that is convenient and easy to use.

It is another object of the present invention to provide a mineralization system that prevents bacterial contamination.

It is another object of the present invention to provide a mineralization system that allows the user to set the rate and type of dosing.

It is another object the present invention to provide a mineralization system that relies upon liquid dosing and avoids the use of mineral-containing clay pellets.

It is another object of the present invention to provide a mineralization system which has a precise output.

It is a further object of the present invention to provide a mineralization system that allows for simple and easy placement of the mineral or supplement-containing bottle.

It is a further object of the present invention to provide a mineralization system that assures proper positioning of the mineral or supplement-containing bottle.

It is still a further object of the present invention to provide a mineralization system that assures a proper suction of the mineral-containing liquid from the bottle and into the treated water.

These and other objects and advantages of the present invention will become apparent from a reading of the attached specification and appended claims.

BRIEF SUMMARY OF THE INVENTION

The present invention is an apparatus for the mineralization of drinking water. This apparatus comprises is a housing having a filter positioned in the housing, a container receptacle assembly affixed to or formed on the housing, a pump cooperative with the container receptacle assembly, and a manifold connected to an outlet of the pump and to an outlet of the filter. The housing has an inlet adapted to allow tap water to enter an inlet of the housing and an outlet adapted to allow the drinking water to exit the housing. The filter is connected or interconnected to the inlet of the housing. The filter is adapted to filter contaminants from the tap water and to produce a filtered water therefrom. The container receptacle assembly is adapted to connect with a bottle containing a mineral or supplement therein. The container receptacle assembly has an inlet adapted to connect with an opening of the bottle. The pump is cooperative with the container receptacle assembly and adapted to pass the mineral or supplement in a measured amount from the bottle. The manifold has an interior adapted to mix the mineral or supplement with the filtered water. The manifold has an outlet connected or interconnected to the outlet of the housing or is the outlet of the housing.

In the present invention, the container receptacle assembly comprises a bracket affixed to the surface of the housing. This bracket defines an upper yoke and a lower yoke. The lower yoke is adapted to engage with a neck of the bottle. An outer cap is affixed to a conduit. The outer cap is adapted to releasably extend over the opening of the bottle. The upper yoke is adapted to limit an upper travel of the outer cap. The conduit extends to the pump. The outer cap has a generally planar upper surface and an annular portion extending downwardly from the generally planar upper surface.

The upper surface is adapted to be releasably positioned against an over the opening of the bottle. The annular portion is adapted to surround a portion of the neck of the bottle. The outer cap has a nipple extending downwardly from the upper surface. The nipple is adapted to engage with the opening of the bottle so as to draw a portion of the mineral or supplement from the bottle. The nipple is connected to the conduit. The container receptacle assembly further includes an inner cap adapted to be received in the opening the bottle. The inner cap has a receptacle formed therein. The receptacle releasably receives the nipple of the outer cap. The receptacle has a straw adapted to extend into the bottle so that the straw can pass the mineral or supplement from the bottle into the nipple. A clip is releasably affixed over the upper portion of the outer. The clip is interposed between the upper surface of the outer cap and an underside of the upper yoke when the outer cap is positioned over the inner cap. The upper yoke and the lower yoke are in parallel planar relationship. The outer cap is positioned between the upper yoke and the lower yoke.

In the present invention, the container receptacle assembly is positioned above the filter. The filter is positioned in a lower portion of the housing. The filter has an end accessible from an exterior of the housing. In the present invention, the filter can include a plurality of filters. Specifically, there can be a first filter positioned in the housing and a second filter positioned in the housing below the first filter. The first filter is connected to the second filter so as to discharge a filtrate therefrom into the first filter. In the preferred embodiment of the present invention, the first filter is a pretreatment filter connected to the inlet of the housing. The second filter is a reverse osmosis filter. The second filter is connected to the manifold. Another pump is positioned in the housing and cooperative with the reverse osmosis filter so as to pass water under pressure through the reverse osmosis filter.

The pump is a peristaltic pump in the preferred embodiment of the present invention. This peristaltic pump is positioned adjacent to the container receptacle assembly at an upper portion of the housing. The container receptacle assembly comprises at least a pair of container receptacle assemblies positioned at a forward surface of the housing. The at least a pair of container receptacle assemblies are arranged in side-by-side relationship. A valve is cooperative with the inlet of the housing. This valve is movable between an open position and a closed position. The closed position blocks the tap water from flowing to the filter. The valve has a portion extending outwardly of the housing so as to be accessible exterior of the housing. A first cover extends over the container receptacle assembly and is positioned against the housing. A second cover extends over an end of the filter and is positioned against the housing.

The present invention further comprises a bottle containing the mineral or supplement in liquid form. This bottle is removably received by the container receptacle assembly. In particular, the bottle has an inner cap fixedly positioned in the opening of the bottle. This inner cap has an upper surface affixed over the opening and an annular portion extending downwardly from the upper surface. The annular portion bears against the inner wall of the neck of the bottle. The inner cap has a receptacle opening at the upper surface of the inner cap. The receptacle of the inner cap has a channel extending downwardly therefrom so as to open to the interior of the bottle. The inner cap has a straw extending through the channel and into the interior of the bottle. The straw has an upper end opening at the receptacle. The upper surface of the inner cap has a hole formed therethrough. The hole has an air filter material covering the hole or received within the hole. The air filter material is adapted to allow air flow into the interior of the bottle while blocking airborne contaminants from entering the bottle.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
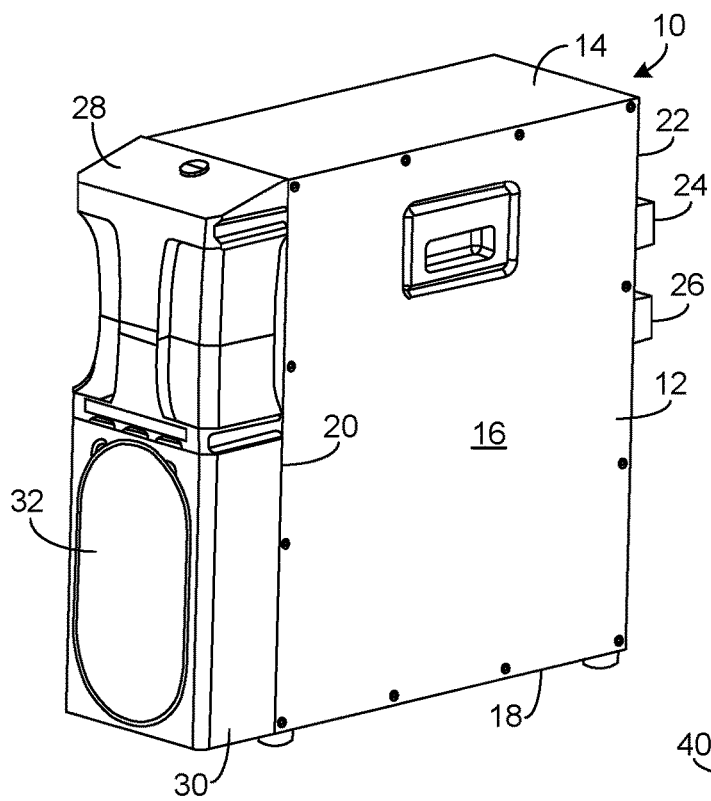
FIG. 1 is an upper perspective view of the water mineralization system of the present invention.

Referring to FIG. 1, there shown the water mineralization system 10 in accordance with the teachings of the present invention. The water mineralization system 10 includes a housing 12 having a generally rectangular cubicle configuration. In particular, housing 12 has upper surface 14, side wall 16, bottom 18, front wall 20 and back wall 22. Walls 14, 16, 18 and 20 enclose the assembly for the treatment of water. In particular, in FIG. 1, the back wall 22 includes an inlet connection 24. Inlet connection 24 is adapted to allow tap water to be introduced into the interior of the housing 12. A support 26 is illustrated below the inlet 24. Support 26 is configured so as to support a line extending for the introduction of tap water into the housing 12. An outlet for the mineralized drinking water is positioned on a side of the inlet 24 (not shown in FIG. 1).

In FIG. 1, it can be seen that there is a first cover 28 that is positioned against the front wall 20 of the housing 12. This first cover 28 extends over the mineral or supplement-containing bottles used in the dosing of minerals into the drinking water. Cover 28 is removably positioned adjacent to the upper surface 14 of the housing 12. A second cover 30 is positioned against the front wall 20 of the housing 12 and extends so as to be positioned generally adjacent to the bottom 18 of the container 12. Second cover 30 is intended to removably cover the filters contained within the housing 12. In particular, second cover 30 can include a flap or surface 32 that can be specifically removed from the cover 30 so as to allow direct access to the filters within the housing 12.

Figure 2:
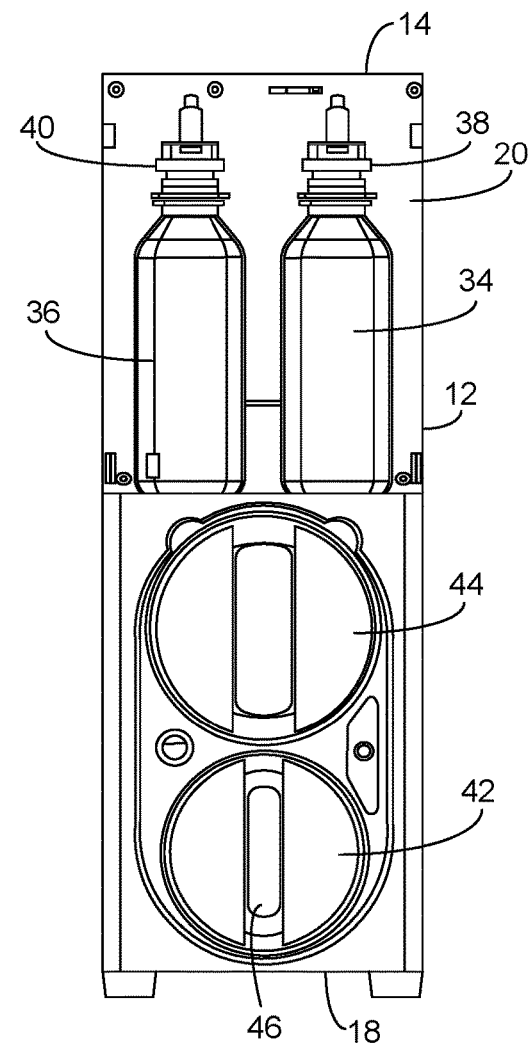
FIG. 2 is a front end view of the water mineralization system of the present invention with the covers removed therefrom.

FIG. 2 shows the configuration at the front wall 20 of the housing 12. In FIG. 2, it can be seen that there is a first bottle 34 and a second bottle 36 that are positioned adjacent to the top 14 of housing 12. Each of the bottles 34 and 36 are connected to container receptacle assemblies 38 and 40. The container receptacle assemblies 38 and 40 have a unique configuration which is described in greater detail herein in association with FIGS. 5-7. The bottles 34 and 36 are removably connected respectively to the container receptacle assemblies 38 and 40. The bottles 34 and 36 can contain minerals and/or supplements therein. In particular, one of the bottles can contain one type of mineral and the other bottle can contain another type of mineral. As such, through a control system, the filtered drinking water can be dosed with a desired quantity of the minerals or supplements from bottle 34 and a desired quantity of the minerals or supplements from bottle 36. If necessary, the control system can be actuated so as to prevent any of the minerals in either of the bottles 34 and 36 from entering the system. The controls can also be adapted to control the rate at which the minerals pass from the bottles 34 and 36 into the filtered water within the interior of the housing 12.

FIG. 2 shows the front wall 20 of the housing 12 with the second cover 30 removed. The removal of the second cover 30 exposes a first filter 42 and a second filter 44. The end of the first filter 42 is exposed at the front wall 20 so that the handle 46 of first filter 42 can be accessed. As such, if it is desired to remove or repair the first filter 42, it is only necessary to remove the cover 30 (or flap 32), access the handle 46, rotate the handle 46 and slide the first filter 42 out of position. A similar action can occur with respect to the second filter 44.

The first filter 42, in the preferred embodiment of the present invention, is a pretreatment filter or a carbon filter. In the preferred embodiment the present invention, the second filter 44 is a reverse osmosis filter. When the first filter 42 is a pretreatment filter, the tap water entering the inlet 24 of the housing 12 will flow in this pretreatment filter so that the pretreatment filter can provide an initial treatment to the water and remove sediment and other contaminants therefrom. The water will flow from the pretreatment filter 42 into the reverse osmosis filter 44 for further removal of any metals, chemicals, contaminants or ions from the water. Importantly, each of the first filter 42 and second filter 44 is located adjacent to the bottom 18 of the housing 12. The first filter 42 and the second filter 44 are also located below the bottles 34 and 36 and located below the container receptacle assemblies 38 and 40. This arrangement greatly improves efficiency in terms of the management of the filters and the bottles. The ease of accessibility of the filters 42 and 44 greatly improves efficiency in the water treatment process and the repair or replacement of the filters.

Figure 3:
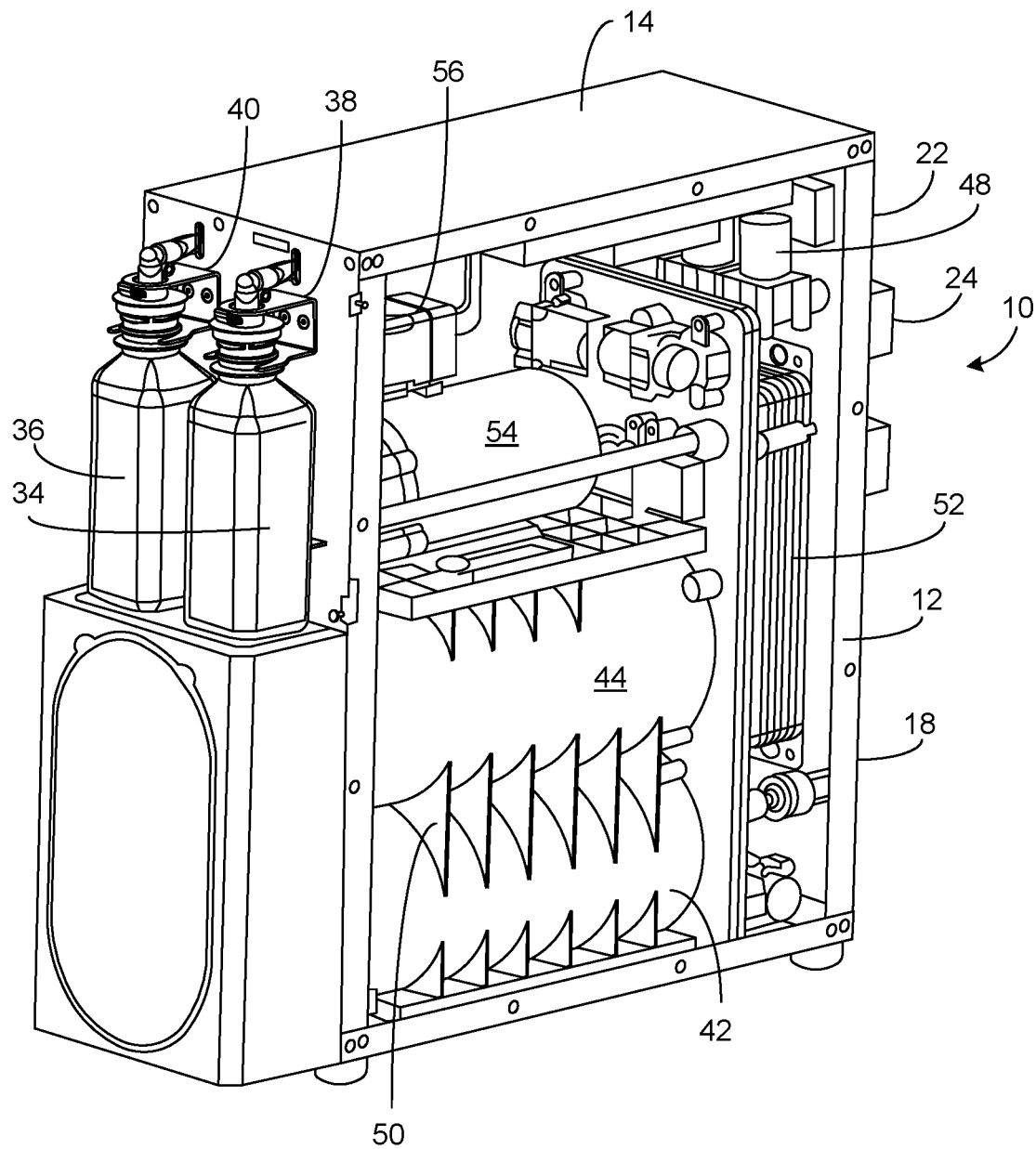
FIG. 3 is an upper perspective view of the water mineralization system of the present invention showing the interior of the housing and the equipment within the interior of the housing.

FIG. 3 further shows the water mineralization system 10 of the present invention. In particular, FIG. 3 shows that the inlet 24 at the back wall 22 of housing 12 has a valve 48 associated therewith. Valve 48 is movable between an open position and a closed position. In the closed position, tap water flow into the interior of housing 12 is blocked. In the open position, tap water flow into the interior of the housing 12 is permitted. The valve 48 is easily accessible so as to allow water flow to be immediately turned off in the event that leaks should occur or in the event that leak detection equipment within the interior of the housing 12 should signal a leak. The present invention avoids the need to locate the source of the water flow in order to stop the water flow to the water mineralization system 10.

In FIG. 3, it can be seen that the first filter 42 and the second filter 44 extend longitudinally across the housing 12. Various brackets 50 support these filters in their desired position. A manifold 52 is illustrated as positioned adjacent to the back wall 18 of the housing 12. Manifold 52 extends in a generally vertical orientation. The manifold 52 is positioned between the first and second filters 42 and 44 and the back wall 18. Manifold 52, as will be explained hereinafter, serves to receive the flow of the mineral or supplement-containing liquid as pumped from the bottles 34 and 36 and mixes this mineral-containing liquid in the manifold 52 with the filtered water from the first and second filters 42 and 44.

Since it is necessary to pressurize the pre-treated water in order to have the pretreatment water flow through the reverse osmosis filter 44, a diaphragm pump 54 is positioned in the interior of housing 12. Diaphragm pump 54 will receive the pretreated water from the first filter 42, pressurize the water, and then pass the water, under pressure, through the second filter 44 (the reverse osmosis filter). The filtrate from the second filter 44 can then flow into the manifold 52 for the purposes of mixing the minerals with the demineralized water.

In the present invention, it is very important to control the rate and amount of the mineral or supplement-containing liquid from the bottles 34 and 36 that enters the filtered water. As such, a peristaltic pump 56 is used in association with each of the bottles 34 and 36. Peristaltic pump 56 operates in a conventional manner so as to assure the delivery of a desired quantity or rate of mineral-containing liquid to the manifold 52. Peristaltic pumps, as they are known, utilize flexible tubes and rollers so as to pass a fixed amount of fluid flow. The peristaltic pump 56 avoids the use of any valves. Suitable servomotors can be utilized in conjunction with the peristaltic pump 56 so as to control the rate at which the mineral-containing liquid is discharged into the manifold 52.

FIG. 3 further shows that the water mineralization system 10 has special container receptacle assemblies 38 and 40 positioned adjacent to the top 14 of housing 12. Peristaltic pump 56 is positioned on the interior of housing 12 and adjacent to these container receptacle assemblies 38. The close positioning of the peristaltic pump 56 to the container receptacle assemblies 38 and 40 assures the proper operation of the peristaltic pump and the proper delivery of fluid from the bottles 34 and 36. If the peristaltic pump 56 were not positioned adjacent to the container receptacle assemblies 38 and 40, there could be more dosing error associated with the delivery of the mineral-containing liquid from the bottles 34 and 36.

Figure 4:
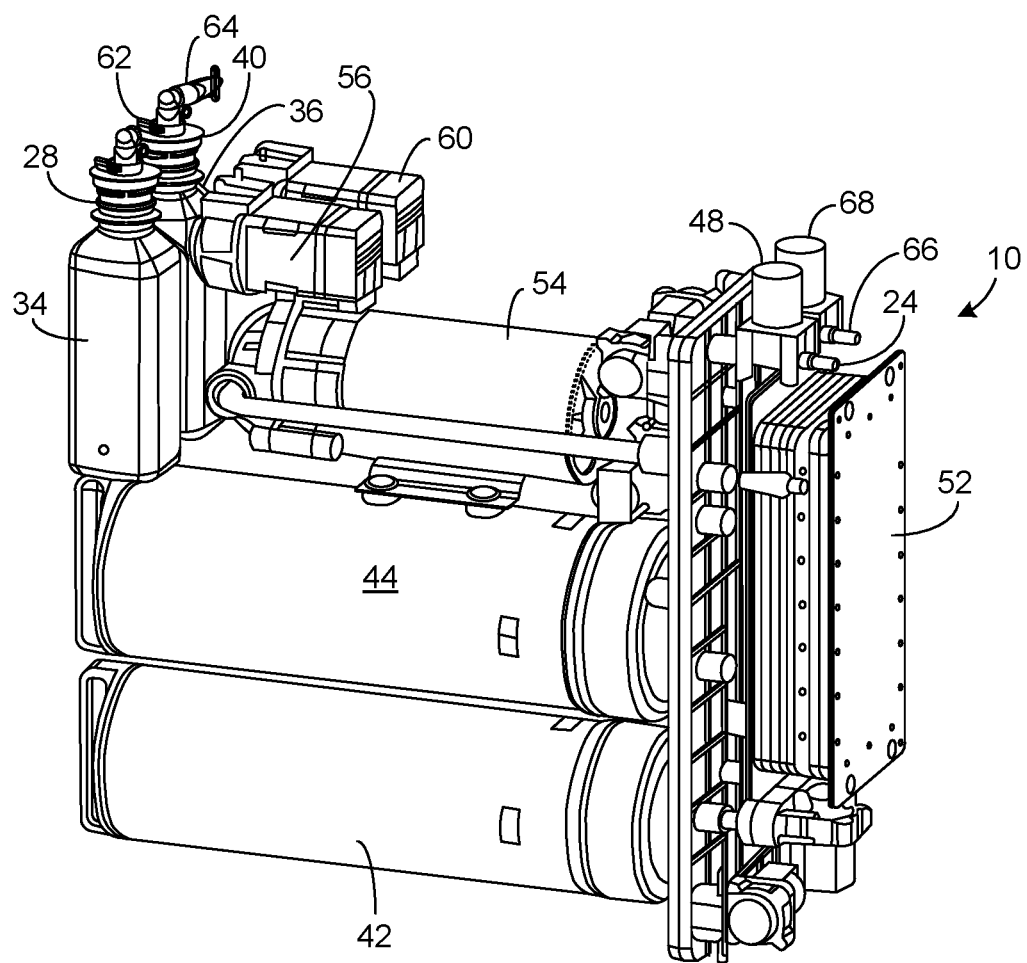
FIG. 4 is an upper perspective view showing the water treatment components associated with the water mineralization system of the present invention.

FIG. 4 shows the interior of the water mineralization system 10 of the present invention. In particular, FIG. 4 shows the first filter 42 and the second filter 44 arranged one on top of another adjacent to the bottom of the housing. Bottles 34 and 36 are positioned adjacent to the top of the housing. The peristaltic pump 56 is positioned adjacent to the container receptacle assembly 38. Peristaltic pump 60 is positioned adjacent to the container receptacle assembly 40. A line or conduit will extend from the elbows 62 and 64 of the respective container receptacle assemblies 38 and 40 to the respective peristaltic pumps 56 and 60.

FIG. 4 shows the configuration of the inlet 24 and the outlet 66. Inlet 24 receives the tap water into the interior of the housing. Outlet 66 allows for the discharge of mineralized drinking water from the housing. Valve 48 extends outwardly from the inlet 24 and operates to control the flow of water through the inlet 24. Valve 68 is associated with the outlet 66 and can control the flow of mineralized drinking water out of the outlet 66. Initially, the tap water will flow through the inlet 24 and down to the first filter 42 for pretreatment purposes. The outlet of the first filter 42 will flow to the diaphragm pump 54 for pressurization prior to passing to the second filter 44 (the reverse osmosis filter). Ultimately, the filtered water from the reverse osmosis filter 44 will be devoid of minerals. It can then flow into the manifold 52 for mixing with a mineral-containing liquid from bottles 34 and 36. After mixing, the manifold 52 will then pass the flow of the mineralized drinking water to the outlet 66. The manifold 52 can be connected to the outlet 66 of the housing 12 or it can be the outlet of the housing 12.

Figure 5:
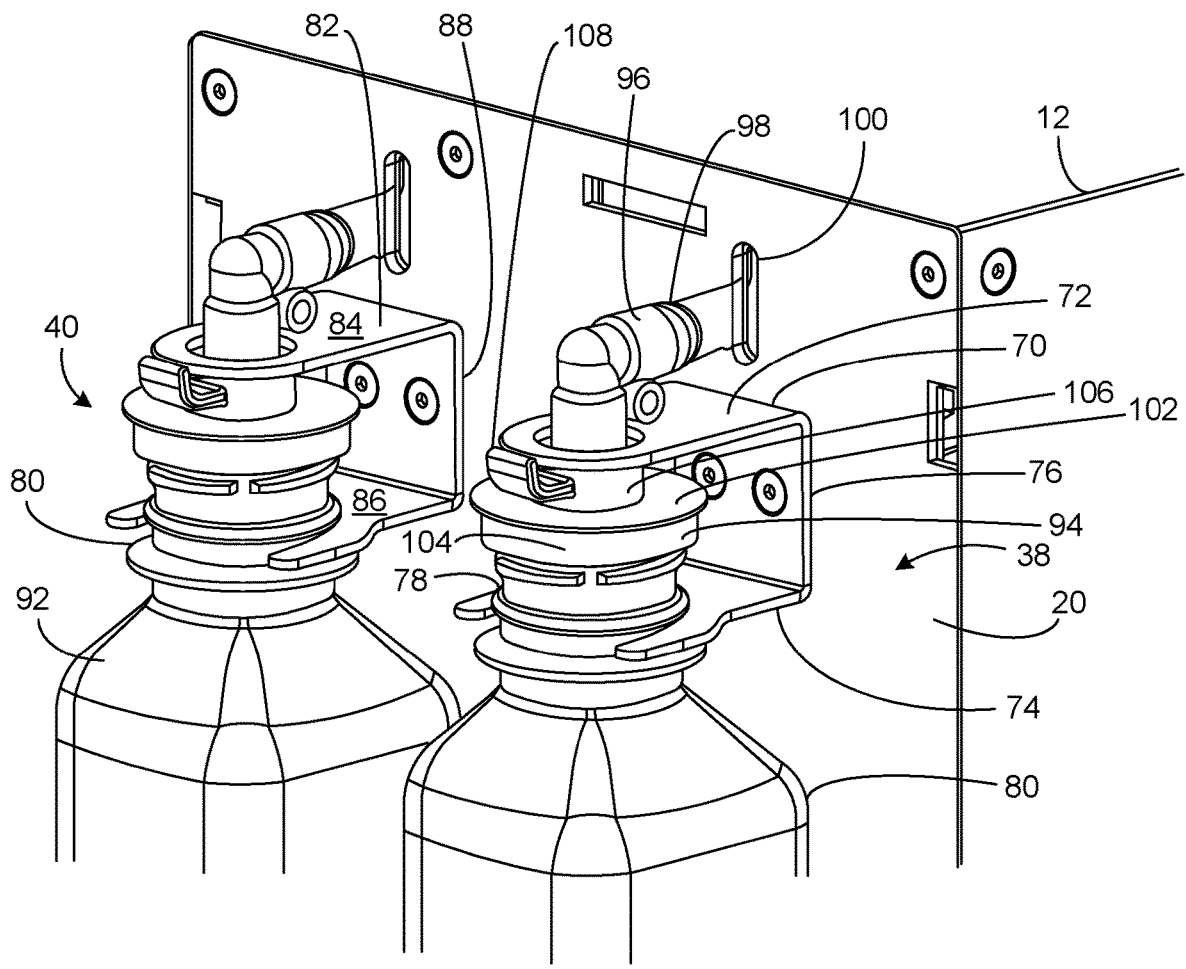
FIG. 5 is an upper perspective close-up view of the container receptacle assembly of the present invention.

FIG. 5 is a detailed view showing the container receptacle assemblies 38 and 40 of the present invention. It can be seen that the container receptacle assemblies 38 and 40 are mounted to the front wall 20 of housing 12. In particular, the container receptacle assembly 38 has a bracket 70 affixed to the front wall 20 of housing 12. Bracket 70 defines an upper yoke 72 and a lower yoke 74. Upper yoke 72 is in parallel planar relationship to the lower yoke 74. The central portion 76 of the bracket 70 is screwed or bolted to the front wall 20 of the housing 12. It can be seen that the lower yoke 74 is adapted to engage with the neck 78 of bottle 80.

Similarly, the second container receptacle assembly 40 includes bracket 82 affixed to the front wall 20 of housing 12 in side-by-side relationship to the first bracket 70. Once again, the bracket 82 includes an upper yoke 84 and a lower yoke 86 in parallel planar relationship. A central portion 88 is bolted or screwed to the front wall 20 of housing 12. The lower yoke 86 is adapted to receive the neck 90 of bottle 92. The second container receptacle 40 will identical configuration to that of the first container receptacle assembly 38. As such, the description associated hereinafter in association with a first container receptacle assembly 38 applies to the second container receptacle assembly 40.

In FIG. 5, there is an outer cap 94 that extends over the top of the neck 78 of bottle 80. A conduit 96 in the pipe elbow 98 is connected to an upper portion of the outer cap 94 (not shown). The conduit 96 will extend through slot 100 in the front wall 20 of housing 12. It can be seen that the slot 100 has a length which is greater than the diameter of the conduit 96. As such, this provides for a certain amount of "play" during the lifting and lowering of the elbow 98 and the outer cap 94. The upper yoke 72 is adapted to limit an upward travel of the outer 94. The conduit 96 will communicate with the peristaltic pump 56.

The outer cap 94 has a generally planar upper surface 102 and an annular portion 104 extending downwardly from the generally planar upper surface 102. The generally planar upper surface is adapted to be releasably positioned adjacent an opening of the bottle 80. The annular portion 104 surrounds a portion of the neck 78 of the bottle 80. As will be described hereinafter, the outer cap 94 has a nipple (not shown) that extends downwardly from the generally planar upper surface 102. This nipple is adapted to engage with an opening of the bottle 80 so as to draw a portion of the mineral or supplement from the bottle 80. The nipple will be connected to the conduit 96. A clip 106 is removably affixed over an upper portion of the outer cap 98. This clip 106 is interposed between the generally planar upper surface 102 of the outer cap 94 and an underside of the upper yoke 72 of the bracket 70 when the outer cap 94 is positioned over the bottle 80. Clip 106 has an arm 108 extending therefrom. As such, it can be easily inserted or removed over an upper portion of the outer cap 94. The introduction of this clip 106 assures that the upper cap 94 remains in its desired position and that the connections the interior of the outer cap 94 remain intact, even during the vibration of equipment associated with the system of the present invention.

Figure 6:
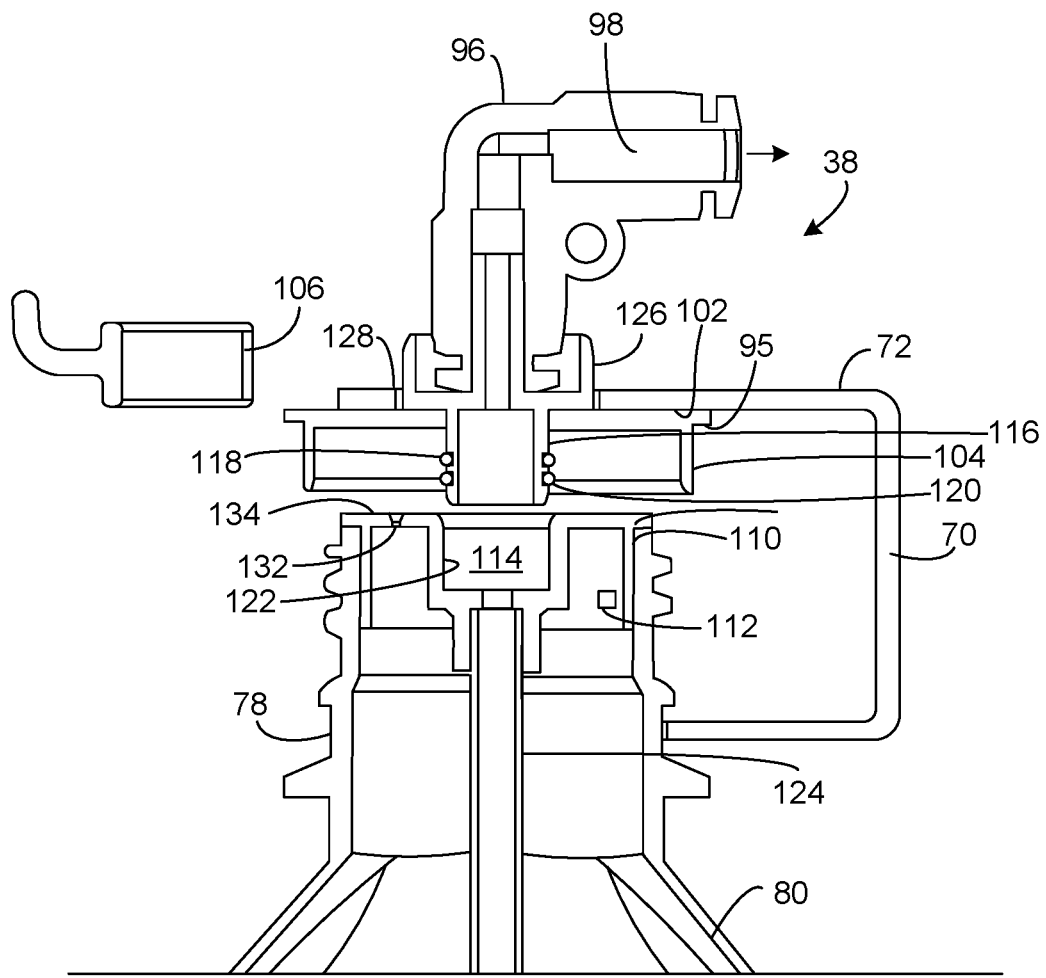
FIG. 6 is a cross-sectional view of the container receptacle assembly of the present invention showing the outer cap separated from the inner cap.

FIG. 6 is a cross-sectional view of the container receptacle assembly 38. A similar construction is associated with the container receptacle assembly 40. In FIG. 6, the bottle 80 has a neck 78 extending upwardly therefrom. The bottle 80 has an opening 110 at the upper end thereof. An inner cap 112 is received in the opening 110 of the bottle 80. This inner cap 112 has a receptacle 114 therein. The receptacle 114 releasably receives the nipple 116 of the outer cap 94. The receptacle 114 is circular. Similarly, the nipple 116 has an annular configuration. As such, 0-rings seals 118 and 120 are received in notches formed on the nipple 116. 0-rings seals 118 and 120 will engage in a liquid-tight manner with the inner wall 122 of the receptacle 114. This assures a liquid-tight connection between the outer cap 94 and the inner cap 112. The receptacle 114 has a straw 124 extending into the bottle 80. Straw 124 can extend all the way to the bottom of the bottle 80 so as to continue to draw the mineral or supplement-containing liquid from the interior of the bottle 80. The suction exerted by the peristaltic pump 56 will act on the conduit 96 of the pipe elbow 98. As such, the suction force will be drawn through the conduit 98. The suction force (illustrated by the arrow in FIG. 6) is adapted to draw the liquid from the interior of bottle 80 when the nipple 116 is engaged with the receptacle 114.

FIG. 6 illustrates that the outer cap 94 has a generally planar upper surface 102 and an annular portion 104 extending downwardly therefrom. Outer cap 94 also has an upper portion 126 engaged with a convention quick connect/disconnect coupling with the pipe elbow 96. There is an opening 128 formed in the upper yoke 72 of bracket 70 through which this upper portion 126 extends. The upper portion 126 can move up and down freely through this opening 128. The clip 106 is illustrated as having been removed from the space between the outer cap 94 and the inner cap 12.

In FIG. 6, there is shown that the upper surface 130 of the inner cap 112 has a hole 132 formed therethrough. Hole 132 is a vacuum-breaking air passage. As such, the open air flow will avoid any vacuum locks that could otherwise occur within the interior of the bottle 80. Importantly, an air filter material 134 is positioned over the hole 132 or into the hole 152. This air filter material 134 can be in the nature of N95 facemask material. As such, it filters 95% of airborne bacteria. Ultimately, the air filter material 134 blocks airborne contaminants from entering the interior of the bottle 80 while allowing airflow through the hole 132. The air filter material 134 will further assure that there is enough space between the outer cap 94 and the inner cap 112 so as to allow airflow therebetween.

Figure 7:
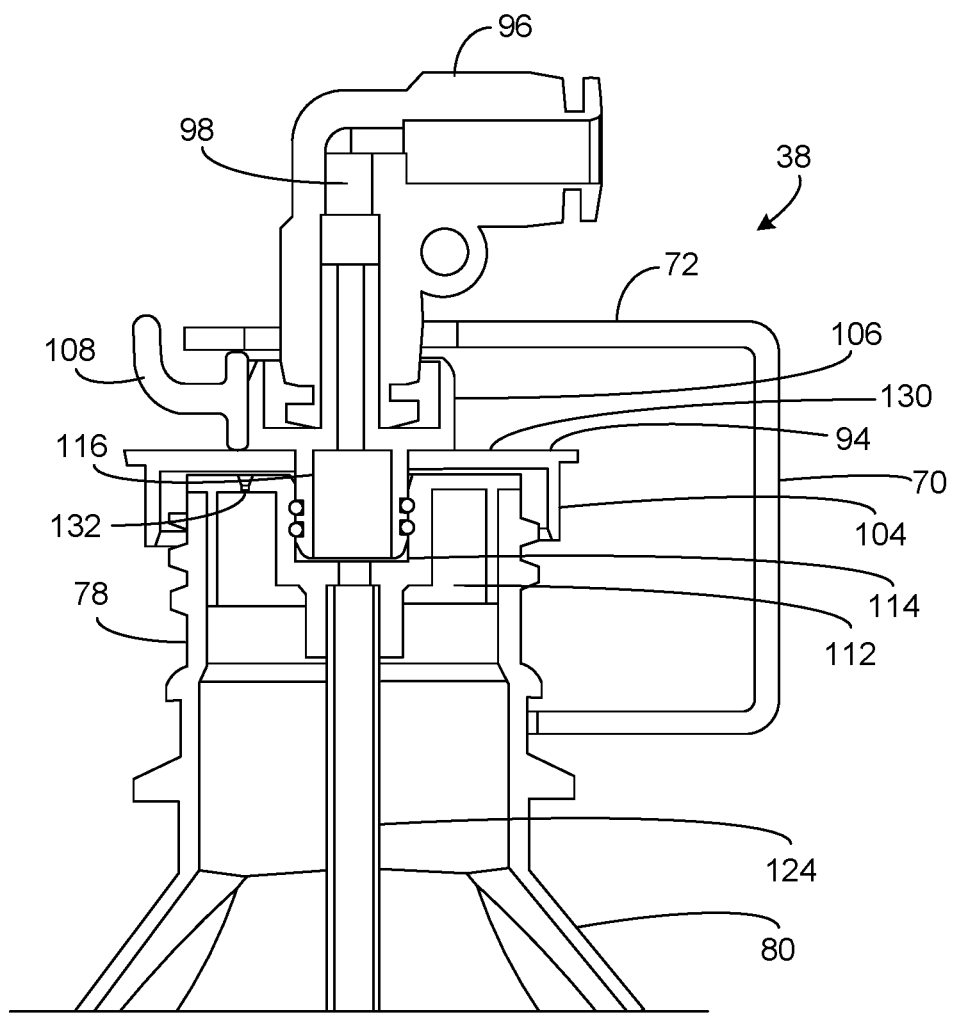
FIG. 7 is a cross-sectional view of the container receptacle assembly of the present invention with the upper cap engaged with the lower cap of the bottle and with the clip in position.

FIG. 7 shows the container receptacle assembly 38 with the connections made between the outer cap 94 and the inner cap 112. FIG. 7 shows that the nipple 116 is received within the receptacle 114. The liquid-tight seal is established by the 0-rings seals extending around the circumference of the nipple 116. The outer cap 94 will have the annular portion 104 extending in spaced relationship around the neck 78 of the bottle 80 and over the opening of the bottle. The straw 124 will then communicate with the receptacle 114 and be in fluid communication with the conduit 98 of elbow 96. As such, the peristaltic pump 56 can draw the liquid from the bottle 80 into the straw 124, into the receptacle 114, through the conduit 98, and ultimately to the manifold for mixing with the filtered water. The underside of the top surface 130 of the outer cap 94 will be generally adjacent to the upper surface of the inner cap 112 and spaced slightly so that airflow can pass through the air filter material and into the hole 132 so as to break any vacuum that could occur within the interior of the bottle 80 or within the system of the present invention.

FIG. 7 shows that the clip 106 is installed between the upper yoke 72 of bracket 70 and the top surface 130 of the outer cap 94. Arm 108 of clip 106 extends outwardly of the upper yoke 72 for easy access. The placement of the clip 106 in the manner shown in FIG. 7 assures that the nipple 116 is properly positioned in the receptacle 114. Clip 106 assures that this proper seating and connection of the various components is assured even during vibrations of the water mineralizing system 10 of the present invention.

In order to remove the bottle 80, it is only necessary to first remove the clip 106 from its position between the top surface 130 of the outer cap 94 and the underside of the upper yoke of bracket 70. This is carried out by simply grabbing the arm 108 and sliding the clip 106 outwardly of the bracket 70. Next, the elbow 96 can be lifted so as to slide within the slot 100 at the front face 20 of the housing 12. This will cause the nipple 116 to separate from the receptacle 114. The annular portion 104 will then separate from its position surrounding the neck 78 of bottle 80. The bottle 80, along with the inner cap 112 received therein, can be separated from the outer cap 94 and from the bracket 70. A new bottle can then be inserted into position, the yoke 96 lowered, the nipple 116 received within the receptacle 114, and a new connection is easily and simply established.

A control system can be employed the present invention so as to control the rate of operation of the peristaltic pump and the other components of the system. The control system can be manually operated or operated with a touchscreen so that the user can input the type of mineral to be introduced into the system, the rate of introduction of the mineral into the system, the amount of minerals to be introduced into the demineralized water, and other features. For example, under certain circumstances, an athlete may desire more minerals to be mixed with the water than an average person. Other persons may have taste preferences and will desire less or more of a particular mineral. As such, the present invention is adaptable to a wide variety of needs and desires. Ultimately, the system is controllable in such a way as to produce an optimal mineralized water output for consumption by individuals.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

The invention claimed is:

1. An apparatus for the mineralization of drinking water, the apparatus comprising:
 a housing having an interior, said housing having an inlet adapted to allow tap water to enter the interior of said housing and an outlet adapted to allow the drinking water to exit the housing;
 a filter positioned in said housing, said filter connected or interconnected to the inlet of said housing, said filter adapted to filter contaminants and remove dissolved minerals from the tap water and produce a filtered demineralized water therefrom;
 a container receptacle assembly affixed to or formed on an outer surface of said housing, said container receptacle assembly adapted to connect with a bottle containing a mineral or supplement therein, said container receptacle assembly having an inlet adapted to connect with an opening of the bottle, said container receptacle comprising a bracket affixed to said housing, the bracket having a lower portion adapted to engage with a neck of the bottle, and an upper portion engaging a conduit, the conduit fluidly communicating with the interior of the bottle;
 a pump cooperative with said container receptacle assembly and adapted to pass the mineral or supplement in a measured amount from the bottle, the conduit extending to said pump; and
 a manifold connected to an outlet of said pump and an outlet of said filter, said manifold having an interior adapted to mix the mineral or supplement with the filtered water, said manifold having an outlet connected or interconnected to the outlet of said housing or which is the outlet of the housing.

2. The apparatus of claim 1, said container receptacle assembly further comprising:
 an outer cap affixed to the conduit, the outer cap adapted to releasably extend over the opening of the bottle, the upper portion of the bracket adapted to limit an upward travel of said outer cap.

3. The apparatus of claim 2, said outer cap having a generally planar upper surface and an annular portion extending downwardly from the generally planar upper surface, the generally planar upper surface adapted to be releasably positioned over the opening of the bottle, the annular portion adapted to surround a portion of the neck of the bottle, said outer cap having a nipple extending outwardly from the generally planar upper surface, the nipple adapted to engage with the opening of the bottle so as to draw a portion of the mineral or supplement from the bottle, the nipple being connected to the conduit.

4. The apparatus of claim 3, the container receptacle assembly further comprising:
 an inner cap adapted to be received in the opening of the bottle, said inner cap having a receptacle formed therein, the receptacle releasably receiving the nipple of said outer cap, the receptacle having a straw adapted to extend into the bottle such that the straw can pass the mineral or supplement from the bottle into the nipple.

5. The apparatus of claim 4, further comprising:
 a clip removably affixed over an upper portion of said outer cap, said clip interposed between the generally planar upper surface of said outer cap and an underside of an upper yoke when said outer cap is positioned over said inner cap.

6. The apparatus of claim 2, the upper portion of the bracket being an upper yoke and the lower portion of the bracket being a lower yoke, the upper yoke and the lower yoke being in parallel planar relationship, said outer cap positioned between the upper yoke and the lower yoke.

7. The apparatus of claim 1, said container receptacle assembly positioned above said filter.

8. The apparatus of claim 1, said filter positioned in a lower portion of said housing, said filter having an end accessible from an exterior of said housing.

9. The apparatus of claim 1, said filter comprising:
 a first filter positioned in said housing; and
 a second filter positioned in said housing below said first filter, said first filter being connected to said second filter such that said second filter discharges a filtrate therefrom into the first filter.

10. The apparatus of claim 1, said pump being a peristaltic pump, the peristaltic pump positioned adjacent said container receptacle assembly at an upper portion of said housing.

11. The apparatus of claim 1, said container receptacle assembly comprising at least a pair of container receptacles positioned at a forward surface of said housing, the at least a pair of container receptacle assemblies being arranged in side-by-side relationship.

12. The apparatus claim 1, further comprising:
 a valve cooperative with the inlet of said housing, said valve movable between an open position and a closed position, the closed position blocking the tap water from flowing to the filter.

13. The apparatus of claim 12, said valve having a portion extending outwardly of said housing so as to be accessible exterior of said housing.

14. The apparatus of claim 1, further comprising:
a first cover extending over said container receptacle assembly and position against said housing; and
a second cover extending over an end of said filter and positioned against said housing.

* * * * *